(12) United States Patent
Alizadeh-Shabdiz et al.

(10) Patent No.: US 10,114,123 B2
(45) Date of Patent: Oct. 30, 2018

(54) ACCURACY AND PERFORMANCE OF THE HYBRID POSITIONING SYSTEM

(71) Applicant: Skyhook Wireless, Inc., Boston, MA (US)

(72) Inventors: Farshid Alizadeh-Shabdiz, Wayland, MA (US); Mohammad A. Heidari, Worcester, MA (US)

(73) Assignee: Skyhook Wireless, Inc., Boston, MA (US)

( * ) Notice: Subject to any disclaimer, the term of this patent is extended or adjusted under 35 U.S.C. 154(b) by 826 days.

(21) Appl. No.: 14/164,799

(22) Filed: Jan. 27, 2014

(65) Prior Publication Data

US 2014/0306842 A1    Oct. 16, 2014

Related U.S. Application Data

(63) Continuation of application No. 12/569,106, filed on Sep. 29, 2009, now Pat. No. 8,638,256.

(51) Int. Cl.
*G01S 19/13* (2010.01)
*G01S 19/48* (2010.01)

(52) U.S. Cl.
CPC .............. *G01S 19/13* (2013.01); *G01S 19/48* (2013.01)

(58) Field of Classification Search
CPC .................................. G01S 19/13; G01S 19/48
USPC ..................................................... 342/357.51
See application file for complete search history.

(56) References Cited

U.S. PATENT DOCUMENTS

| | | | | |
|---|---|---|---|---|
| 6,407,700 B1* | 6/2002 | Giffard | ................. | G01S 19/235 342/357.25 |
| 6,574,557 B2* | 6/2003 | Endo | ...................... | G01S 19/42 342/357.29 |
| 6,725,158 B1* | 4/2004 | Sullivan | ................ | G01S 5/0036 342/357.64 |
| 7,277,054 B2 | 10/2007 | Alanen et al. | | |
| 7,397,424 B2 | 7/2008 | Houri | | |
| 7,587,081 B2* | 9/2009 | Rovira-Mas | ............ | G06T 7/004 345/419 |
| 7,696,923 B2 | 4/2010 | Houri | | |
| 7,916,071 B2* | 3/2011 | Harper | .................. | G01S 5/0036 342/357.31 |
| 2007/0121560 A1* | 5/2007 | Edge | ..................... | H04W 64/00 370/338 |
| 2008/0158053 A1* | 7/2008 | Watanabe | .............. | G01C 21/28 342/357.28 |

(Continued)

*Primary Examiner* — Frank J McGue
(74) *Attorney, Agent, or Firm* — Cesari and McKenna, LLP; James A. Blanchette

(57) ABSTRACT

The present disclosure relates to a method for determining the position of a WLAN positioning system (WPS) and satellite positioning system (SPS) enabled device. The method can include determining an initial WPS position of the device using WPS, calculating an error region around the initial WPS position of the device, dividing the error region into a plurality of points, obtaining satellite measurements from at least two satellites in view of the device, determining a variation in a receiver clock bias for each point within the error region based on the satellite measurements from at least two satellites, selecting the point with the lowest variation in the receiver clock bias, and determining whether or not to use the point with the lowest variation in receiver clock bias to refine the initial WPS position of the device.

20 Claims, 9 Drawing Sheets

(56) References Cited

U.S. PATENT DOCUMENTS

2013/0030931 A1* 1/2013 Moshfeghi ............. G01S 19/48
705/16

* cited by examiner

ACCURACY AND PERFORMANCE OF THE HYBRID POSITIONING SYSTEM

CROSS-REFERENCE TO RELATED APPLICATIONS

This application is a continuation of and claims the benefit under 35 U.S.C. § 120 of U.S. patent application Ser. No. 12/569,106, filed on Sep. 29, 2009, entitled Improvement of the Accuracy and Performance of the Hybrid Positioning System, now U.S. Pat. No. 8,638,256, the contents of which are incorporated herein by reference in their entirety.

This application is also related to the following references:

U.S. patent application Ser. No. 12/479,721, filed Jun. 5, 2009 and entitled "Systems and methods for Using Environmental Information in a Hybrid Positioning System;"

U.S. patent application Ser. No. 12/479,722, filed Jun. 5, 2009 and entitled "Systems and Methods for Maintaining Clock Bias Accuracy in a Hybrid Positioning System;"

U.S. patent application Ser. No. 12/479,723, filed Jun. 5, 2009 and entitled "System and Method for Refining a WLAN-PS Estimated Location Using Satellite Measurements in a Hybrid Positioning System;"

U.S. patent application Ser. No. 12/479,724, filed Jun. 5, 2009 and entitled "Systems and Methods for Determining Position Using a WLAN-PS Estimated Position as an Initial Position in a Hybrid Positioning System;"

U.S. patent application Ser. No. 12/479,727, filed Jun. 5, 2009 and entitled "Methods and Systems for Improving the Accuracy of Expected Error Estimation in a Hybrid Positioning System;"

U.S. patent application Ser. No. 12/479,729, filed Jun. 5, 2009 and entitled "Methods and Systems for Stationary User Detection in a Hybrid Positioning System;"

U.S. patent application Ser. No. 12/479,734, filed Jun. 5, 2009 and entitled "System and Method for Using a Satellite Positioning System to Filter WLAN Access Points in a Hybrid Positioning System;"

U.S. patent application Ser. No. 12/479,718, filed Jun. 5, 2009 and entitled "Method and System for Determining Location Using a Hybrid Satellite and WLAN Positioning System by Selecting the Best WLAN-PS Solution;"

U.S. patent application Ser. No. 12/485,588, filed Jun. 16, 2009 and entitled "Methods and Systems for Determining Location Using a Cellular and WLAN Positioning System by Selecting the Best WLAN PS Solution;"

U.S. patent application Ser. No. 12/485,591, filed Jun. 16, 2009 and entitled "Methods and Systems for Determining Location Using a Cellular and WLAN Positioning System by Selecting the Best Cellular Positioning System Solution;"

U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System;"

U.S. patent application Ser. No. 12/504,373, filed Jul. 16, 2009 and entitled "Systems and Methods for Using a Satellite Positioning System to Detect Moved WLAN Access Points;" and U.S. patent application Ser. No. 12/504,379, filed Jul. 16, 2009 and entitled "Methods and Systems for Determining Location Using a Hybrid Satellite and WLAN Positioning System by Selecting the Best SPS Measurements."

BACKGROUND

1. Field

The present disclosure generally relates to hybrid positioning and more specifically, describes a new method to assess the quality of a set of satellite positioning system (SPS) measurements to be used for hybrid positioning. In order to do so, the disclosure proposes to use variations of clock bias at the receiver side to assess the quality of current set of satellites and their respective range measurements.

2. Description of the Related Art

Positioning using radio signals has attracted increasing attention in the field of location and tracking. The initial research studies on SPS resulted in a Global Positioning System (GPS) which was initially used for military applications and later broadly used for commercial and personal applications as well. The availability of SPS-based positioning has been a major factor in the introduction of Location Based Services (LBS) in advanced mobile communication devices such as smartphones. By determining the position of the receiver, the system is able to provide more effective and more appropriate services to the user.

The Naystar Global Positioning System (GPS) operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location as long as the receiver can see enough of the sky to have four or more satellites "in view." Cellular carriers can use signals originating from and received at cell towers to determine a user's or a mobile device's location. Assisted GPS (AGPS) is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System (SPS). While GPS is the only operational SPS at this writing, other systems are under development or in planning A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock can result in a difference between the receiver clock and the satellite clock, which is referred to as internal SPS receiver clock bias or receiver clock bias. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc (www.skyhookwireless.com).

SPS is based on triangulation (trilateration) using multiple distance measurements from multiple satellites. The receiver measures its distance from at least four satellites. Based on the distance measurements, the receiver solves a set of quadratic equations including, coordinates of the receiver, and, receiver clock bias. In order to quantify the accuracy of the location estimate (quality of estimate of the reported location,) SPS systems use several metrics such as Dilution of Precision ($DOP_0$). (Indices, like index 0, are used to differentiate different DOP definitions here). Widely used in literature, the geometry of the set of visible satellites, indicated by $DOP_0$ metric, is assumed to have correlation with estimated location error. In other words, $DOP_0$ relates the geometry of the satellites to the quality of the location estimate.

In hybrid positioning, the IEL of the receiver is estimated by using a method other than SPS (such as Wireless Local Area Network-based Positioning System or WLAN-PS). The results are then refined once SPS signals are acquired. In current hybrid positioning systems, a 3-D region is constructed centered on the IEL. The size of this 3-D region is related to the accuracy of the estimated location (IEL). Then the positioning system searches through all the possible locations inside the region and selects the location with minimum SPS receiver clock bias variations (Hybrid positioning systems are disclosed in the following commonly used application, the entire contents of which are hereby incorporated by reference: U.S. patent application Ser. No. 12/479,718, filed Jun. 5, 2009 and entitled "Method and System for Determining Location using a Hybrid Satellite and WLAN Positioning System by Selecting the Best WLAN-PS Solution;" U.S. patent application Ser. No. 12/485,588, filed Jun. 16, 2009 and entitled "Method and Systems for Determining Location Using a Cellular and WLAN Positioning System by Selecting the Best WLAN PS Solution;" U.S. patent application Ser. No. 12/485,591, filed Jun. 16, 2009 and entitled "Methods and Systems for Determining Location Using a Cellular and WLAN Positioning System by Selecting the Best Cellular Positioning System Solution;" and U.S. patent application Ser. No. 12/485,595, filed Jun. 16, 2009 and entitled "Methods and Systems for Improving the Accuracy of Expected Error Estimation in Location Determinations Using a Hybrid Cellular and WLAN Positioning System."). The concept is summarized in FIG. 1, as described below. In current hybrid positioning systems, all visible satellites are used to refine IEL. However, some satellites experience multipath and their range estimates are too inaccurate for use in hybrid positioning. Therefore, there is a need for methods to assess the quality of set of current measurements and detect satellites with erroneous range estimates so the system can remove them from location estimation.

It is also possible for the hybrid positioning system to receive a set of SPS signals which are pointing the system very far from the location obtained in the initial estimate. In such cases, SPS measurements might be consistently close to one another, but the overall SPS result might be very different from initial location. In such cases, there is a need to detect the discrepancies between the IEL and the SPS-refined location estimate.

The current hybrid positioning systems use the location with absolute minimum SPS receiver clock bias variation and neglects all the other locations in the region with similar SPS receiver clock bias characteristics. An optimal result can be achieved if one combines results of all the locations with similar SPS receiver clock biases. In such cases, there is a need for an algorithm to combine such locations and obtain a final location.

The conventional methods perform the task of searching through all three dimensions of the region's grid-locations one by one (referred to as 3D-search) and computing the SPS receiver clock bias for each location and then selecting the point with minimum SPS receiver clock bias variation, as illustrated in FIG. 1. In such cases, there is a need for an algorithm to perform a faster search and obtain the final location faster.

SUMMARY

The following description describes a method in hybrid positioning systems to remove satellites with erroneous range estimates from the process of estimation of receiver location. The remaining satellites can then be used to estimate the location of the receiver by the hybrid positioning system which results in more accurate results. Once hybrid positioning system decides on using SPS measurements to refine the IEL, the disclosure describes a method to obtain a more accurate final location estimate using an aggregate of locations with sufficiently small SPS receiver clock bias variation. The following description also describes a method in hybrid positioning to assess the quality of current set of satellites and remove a set of satellites with erroneous range estimate from the process of location estimation. The outcome of the process will determine if the IEL should be used for positioning the receiver location or SPS reported location. The following disclosure also describes a method in hybrid positioning to obtain a faster and relatively more accurate final estimate of the receiver location using two-dimensional searches (referred to as 2D-searches) in each XY, XZ, and YZ planes and combining the results of each of 2D-searches to find the final estimate of the receiver location. The present disclosure also relates to hybrid positioning and more specifically, describes a new method to refine the initial estimated location (IEL) and obtain an improved estimate of the receiver location. In order to so, the method includes a proposal for the removal of satellites with erroneous range estimates from the current set of visible satellites.

In one aspect, the present disclosure relates to a method of determining the position of a WLAN positioning system (WPS) and satellite positioning system (SPS) enabled device including determining an initial WPS position of the device using WPS, calculating an error region around the initial WPS position of the device, dividing the error region into a plurality of points, obtaining satellite measurements from at least two satellites in view of the device, determining a variation in a receiver clock bias for each point within the error region based on the satellite measurements from at least two satellites, selecting the point with the lowest variation in the receiver clock bias, and determining whether or not to use the point with the lowest variation in receiver clock bias to refine the initial WPS position of the device.

In one embodiment, determining whether or not to use the point with the lowest variation in receiver clock bias to refine the initial WPS position of the device includes rejecting the point with the lowest receiver clock bias variation if the point is located on an edge of the error region. In some embodiments, determining whether or not to use the point with the lowest variation in receiver clock bias to refine the initial WPS position of the device includes rejecting the satellite measurements if the region displays monotonicity. In some embodiments, determining whether or not to use the point with the lowest variation in receiver clock bias to refine the initial WPS position of the device includes rejecting a point having a large variation in receiver clock bias. In some embodiments, a large variation in receiver clock bias can include 20 and greater.

In one embodiment, the method includes evaluating the accuracy of individual satellite measurements in order to lower the variation in the receiver clock bias for a set of satellites, and wherein the number of satellites is greater than two. In one embodiment, evaluating the accuracy of individual satellite measurements includes: grouping the satellites into sub-groups of two or more satellites, determining a variation in receiver clock bias for each of the sub-groups, comparing the variation of receiver clock bias in the sub-groups to select a sub-group with a minimum SPS receiver clock bias variation, and determining an individual satellite measurement with an inaccurate receiver clock bias estimate as the satellite which was excluded from the sub-group selected in the previous step. In one embodiment, the method includes determining a minimum value of the receiver clock bias, determining a maximum value of the receiver clock bias, determining a median value of the receiver clock bias, comparing the difference between the minimum value and median and maximum value and median and selecting the larger of these two differences, and determining an individual satellite measurement with an inaccurate receiver clock bias estimate as the satellite which corresponded to the larger selected value in the previous step.

In one embodiment, the method includes discarding satellite measurements from satellites that have inaccurate receiver clock bias estimates. In one embodiment, determining whether or not to use the point with the lowest variation in receiver clock bias as a refined estimate of the initial WPS position of the device includes accepting a point having a small receiver clock bias. In one embodiment, a small variation comprises a value between 0 and 5. In one embodiment, the method includes determining that the WPS position is a final location of the device if no minimum of receiver clock bias variation exists in the error region. In one embodiment, the method includes determining that the WPS position is a final location of the device if value of SPS receiver clock bias was large. In one embodiment, the satellite measurements are obtained from at least three satellites. In one embodiment, the satellite measurements are obtained from more than three satellites.

In another aspect, the present disclosure also relates to a method for determining the position of a WLAN positioning system (WPS) and satellite positioning system (SPS) enabled device including determining an initial WPS position of the device using WPS, calculating an error region around the initial WPS position of the device, dividing the error region into a plurality of points, obtaining satellite measurements from at least two satellites in view of the device, determining a variation of a SPS receiver clock bias for each point within the error region based on the satellite measurements from at least two satellites, selecting a group of points with the lowest variation in the receiver clock bias, and determining a new refined position based on the group of points, wherein the refined location is computed as an average of all the group of points wherein the refined location is computed as a weighted average of all the aggregate points.

In one aspect, the present disclosure also relates a method for to determining the position of a WLAN positioning system (WPS) and satellite positioning system (SPS) enabled device including determining an initial WPS position of the device using WPS, calculating an error region around the initial WPS position of the device, dividing the error region into three planes including an x-y plane, a x-z plane, and a y-z plane, determining a point in each plane with the lowest value of receiver clock bias, and determining a final location of the device by averaging the points in each plane with the lowest value of receiver clock bias.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

Figure 1:
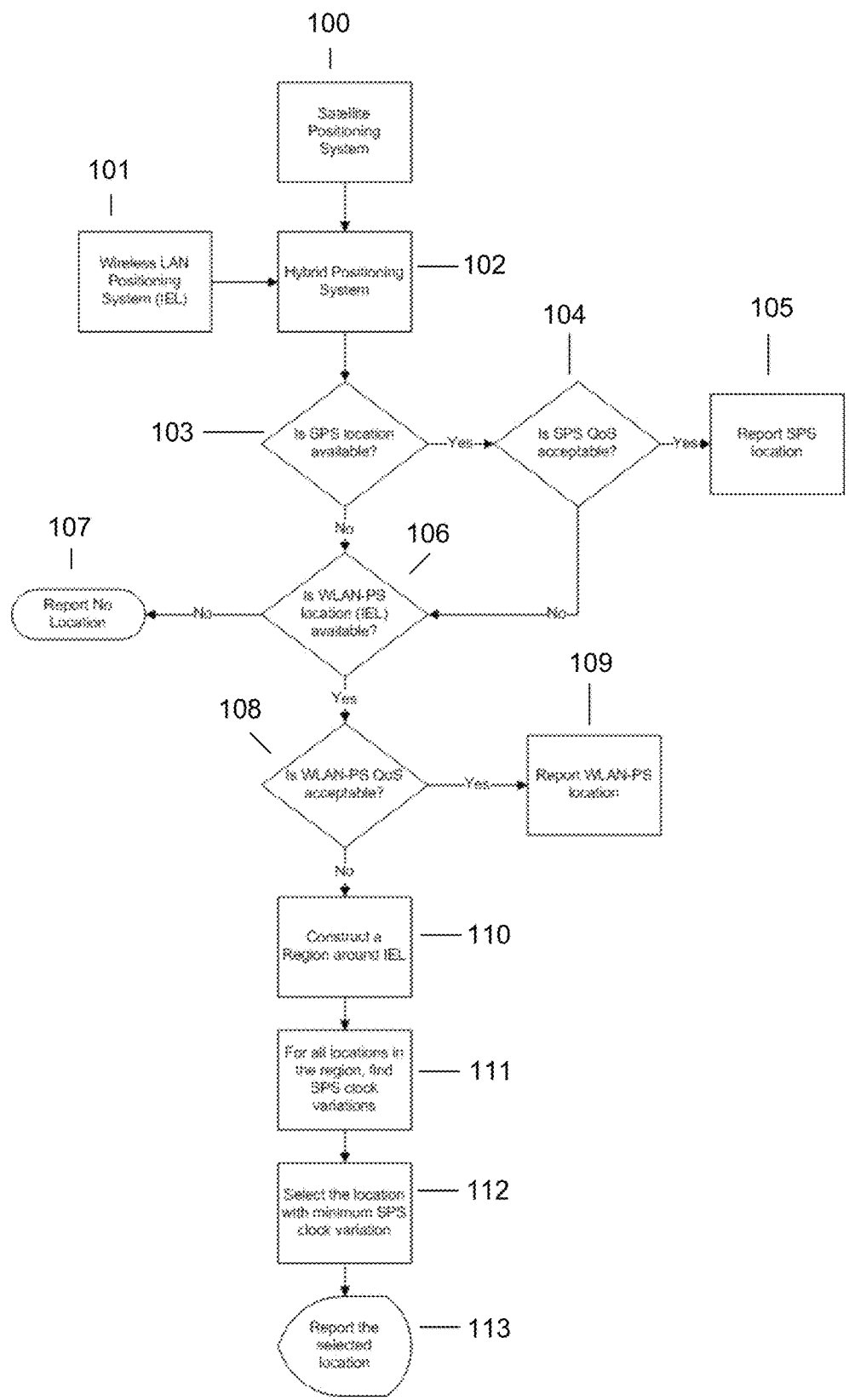
FIG. 1 is a flow chart describing the basic operation of a hybrid positioning system, according to one embodiment of the present disclosure.

The following disclosure relates to systems and methods for evaluating the quality of either a set of satellites or individual satellites in a hybrid positioning system. The quality of the set satellites is evaluated using receiver clock bias. In that capacity, a high quality set of satellites is the one that satellites show consistency in predicting receiver clock bias. For that matter, all the estimations of receiver clock bias from different satellites should be close to one another. On the other hand, a bad quality set of satellites is the one that shows large variations when receiver clock bias is estimated for all satellites. In order to determine receiver clock bias for each satellite, the WLAN positioning system, in the hybrid system, provides an IEL and a region of error around that IEL. The shape and size of the region of error is based on IEL and its accuracy and hence this region relates to the quality of the IEL measurement (QoS). The IEL and the region of error create what will be referred to as the region. The region provides a set of locations where the receiver can be located, i.e., the receiver could be located at any point within the region. In the following paragraphs, the word variation is used to illustrate any measure of disparity between the taken measurements or elements of a vector. As an example of this disparity we have used variance in some of our calculations. Other means of variation such as range between the values can also be used in this approach.

By using each point in the region as an initial location, the receiver clock bias for each satellite at each location can be determined. This results in an array of values for estimates of receiver clock bias for each location inside the region. From these determinations, the variance of the receiver clock bias for each location inside the region can be calculated. This variation in the receiver clock bias can be used to eliminate low quality satellite measurements. For a high quality set of satellites this variation is small and for a low quality set of satellite this variation is large. In principle, if a satellite or several satellites are providing erroneous information, the estimate of the receiver clock bias for those satellites is very different from the other satellites and hence we see large variations when we examine the array of receiver clock bias estimates.

In another embodiment, the variation in the receiver clock bias among all visible satellites for each location can be calculated. The locations with the smallest variation in receiver clock bias can be selected. Those selected locations are then averaged to determine a final location of the receiver.

In another embodiment, the searching of the region for the points with the lowest variation in receiver clock bias is simplified by using a two dimensional method instead of a three dimensional method.

Generally, in such hybrid positioning systems, the final reported location can be one of the following:
1) IEL along with its quality estimate ("QoS");
2) SPS reported location when four or more satellites are visible along with its quality estimate; or
3) A combination of IEL and SPS reported locations.

In the process of location determination using SPS only, the receiver receives raw SPS range measurements and satellite information from satellites in the view of the receiver. Using the range measurements and satellite information of four or more satellites, the receiver solves a set of quadratic equations for the location and the SPS receiver clock bias. Because the same receiver receives all of the satellite information, the SPS receiver clock bias for all the satellites should be the same.

If the SPS location could not be determined or its expected error exceeded its threshold, i.e. poor QoS, the positioning system will look into IEL (reported by a method other than SPS, for example, WPS). If the IEL had sufficiently small expected error, i.e. acceptable QoS, the hybrid positioning system reports IEL as the final location. Otherwise, the system uses the SPS signals to refine the IEL. In the refinement process, the positioning system constructs a 3D region around IEL and searches all the locations in that region for a location with minimum SPS receiver clock bias variation. This location with minimum SPS receiver clock bias variation is the best estimate of the true location inside the region. This process is illustrated in FIG. 1. In FIG. 1, satellite positioning system (SPS) 100 provides satellite information to hybrid positioning system 102. Wireless LAN positioning system (WLAN-PS) 101 provides an IEL. The hybrid positioning system 102 collects the inputs from SPS and WLAN-PS and attempts to improve the precision of the IEL by providing a better estimated location with better accuracy. In 103, the hybrid positioning system checks if SPS has provided an estimated location. If a location was provided by SPS and its accuracy fulfills the requirements set in hybrid positioning system (in 104), the hybrid positioning system reports the SPS location in 105. If a location was not provided by SPS or if its accuracy was not met by the standards set by the hybrid positioning system, hybrid positioning system checks if there is an IEL 106. If no location was provided through IEL as well, the hybrid positioning system reports no location 107. If the IEL was provided, the hybrid positioning system checks to see if the accuracy of the IEL is acceptable 108. If it was acceptable, system reports the IEL as its reported location 109. If the IEL accuracy is unacceptable, the system constructs a region around the IEL 110. For each location inside the constructed region, the hybrid positioning system then finds all the estimates of receiver clock bias and calculates the variance of this set 111. The system then selects the location with minimum variance as its best estimated location within the region 112 and reports it to the interface 113. In perfect scenarios, all the estimates of SPS clock bias are equal so their variance is zero. However, in realistic scenarios this variation is not zero, but it is preferred for the hybrid positioning system to have very small variations for the estimate of SPS receiver clock bias.

The embodiments of this disclosure propose to relate the variations of the SPS receiver clock bias to the quality of the current set of satellites. In order to do so, the disclosure proposes to analyze the SPS receiver clock bias variations for all the locations inside the region specified by IEL and its QoS. The definition of such region can simply start from a sphere with its center on IEL and radius equal (or directly proportional) to QoS and extend to a complex shape around IEL. For all the locations inside this specified region, the hybrid positioning system calculates the variation of the SPS receiver clock bias and selects the location with minimum variation of the SPS receiver clock bias. Based on the value of the location and its position relative to the region, the hybrid positioning system can assess the quality of the current set of satellites to be used in hybrid positioning.

The process of calculating the variation of SPS receiver clock bias starts with estimating the receiver clock bias corresponding to each satellite in the set. Ideally, all the receiver clock biases should be equal. However, in practice, the estimates of receiver clock bias can be different. Then the variation of the estimates can be used to illustrate how far the receiver clock bias estimates are apart. In the case of a large variation of the SPS receiver clock bias, the hybrid positioning system detects discrepancies between the IEL and SPS signals and can reject the use of SPS signals in the hybrid positioning. Alternatively, the relative position of the grid-location with minimum variation inside the region can be used to assess the quality of the SPS signals. If the location with the minimum variation is on the boundary of the defined region, the positioning system can reject the use of SPS signals in hybrid positioning.

As an example, in a hybrid positioning system consisting of an SPS and a WLAN-PS, the WLAN-PS reports an IEL with its expected error, QoS. The hybrid positioning system then has to check if an SPS location is reported. If the SPS location is provided and the SPS expected error is sufficiently small, i.e. an acceptable QoS—for example values of error less than 50 meters, the hybrid positioning system reports the SPS location. If the SPS location is not provided or its expected error exceeds the threshold, i.e. poor QoS, the hybrid positioning system checks the IEL reported by WLAN-PS and its expected error. If the IEL's expected error is sufficiently small, i.e. acceptable QoS—for example values less than 100 meters, the hybrid positioning system reports IEL as the final location. Otherwise, the positioning system uses SPS satellite information and range measurements to refine the IEL and improve the accuracy of the location estimation (in terms of QoS).

Figure 2:
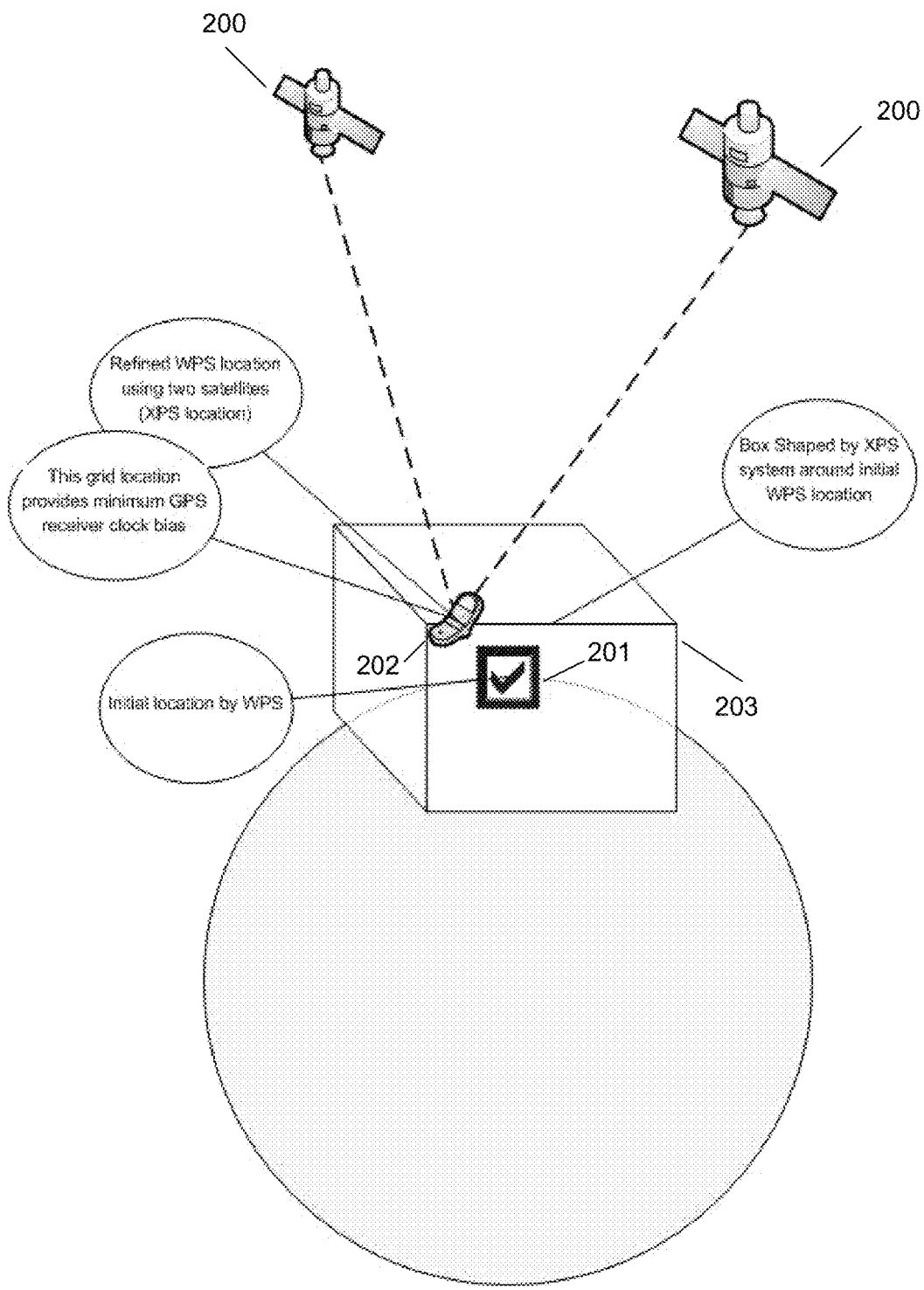
FIG. 2 represents a simple scenario where hybrid positioning system can use SPS signals to improve the accuracy of the IEL. IEL is provided by WLAN-based positioning system and satellite signals from two satellites are used to refine IEL.

In order to assess the quality of current set of satellites in such hybrid positioning systems, the hybrid positioning system constructs a region centered on IEL. The region spans over x, y, and z axes. FIG. 2 represents such scenario. Satellites 200 provide satellite information which can be used in hybrid positioning system to refine the IEL 201. The IEL is provided by WLAN-PS and it is used to construct region 203 around it by hybrid positioning system. The refined location 202 is calculated after the hybrid positioning system uses the satellite information to improve the accuracy of the IEL. The hybrid positioning system then evaluates the variations of SPS receiver clock bias for all the locations inside the region. For each location inside the region, the hybrid positioning system finds all the estimates of the SPS receiver clock bias from all the satellites and catalogs them in an array. The system then finds the variation of the set by comparing the estimates to check how close or how far the SPS receiver clock bias estimates are. The system then selects the location with the minimum SPS receiver clock bias variation. Based on the value and location of the minimum SPS receiver clock bias variation, the hybrid positioning system decides if it should use the SPS information and range measurements to refine the IEL and report the location with minimum SPS receiver clock bias variation. Values between 0 and 5 can be considered as good, while values more than 20 should be rejected. In the case of a large variance of SPS receiver clock bias and/or large distance between the location with minimum variation and the IEL, the hybrid positioning system detects discrepancies between the IEL and the SPS signals and hence rejects the use of SPS signals in hybrid positioning.

For the example of the hybrid positioning system including a WLAN-PS and a SPS, the hybrid positioning system can construct a region centered on IEL (reported by WLAN-PS) using grid locations on different axes. Then for each location inside the region (which are referred to as grid locations), the hybrid positioning system can evaluate the variation of SPS receiver clock bias using $$\bar{\tau}_{rms} = \frac{1}{N}\sqrt{\sum_{i=1}^{N}(\tau_i - \bar{\tau})^2}$$

where $$\bar{\tau} = \frac{1}{N}\sum_{i=1}^{N}\tau_i$$

is the unbiased sample mean of SPS receiver clock bias and $\tau_i$ is the estimate of SPS receiver clock bias from the i th satellite. For example, if for a specific location with four satellites in view the system found SPS receiver clock biases from different satellites to be [10000 10010 10500 9500], the system first finds the average of the set which is 10002.5. Then each element is subtracted from the average and squared which results in [6.25 56.25 247506.25 252506.25]. Then the system sums all the resulted values to get 500075 and the final value for variation is the square root of 500075 divided by number of satellites which gives us. 176.78. This value is high. Therefore, these satellites would not be used for positioning.

Figure 3:
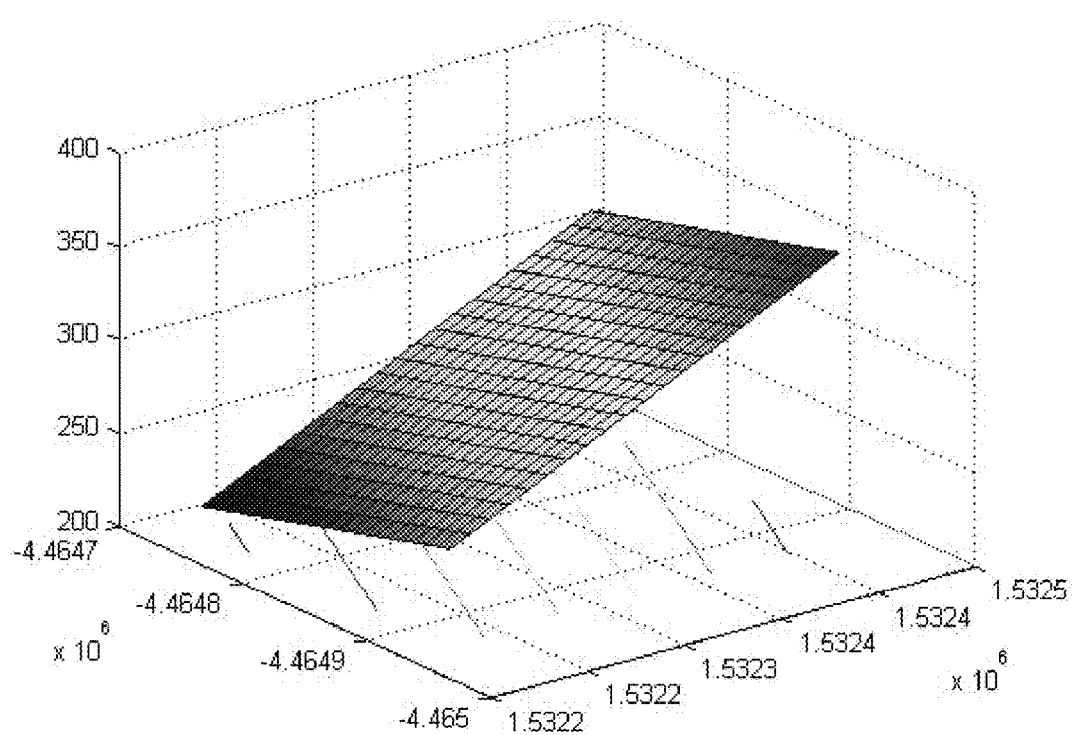
FIG. 3 is a graphical representation of a single surface demonstrating a single z-plane for cases of bad satellite information, according to one embodiment of the present disclosure.

FIG. 3 illustrates such variations for an assessment of the quality of SPS measurements. The Figure represents the values of SPS receiver clock bias for different values of x-axis and y-axis coordinates for a fixed z-value (different from figure's z-axis which shows the value of SPS receiver clock bias).

The large values of the z-axis (which show variations of SPS receiver clock bias) and its monotonic shape for the entire plane prove that for this case the SPS receiver clock bias variation was large and SPS measurements were not in agreement with the IEL.

Figure 4:
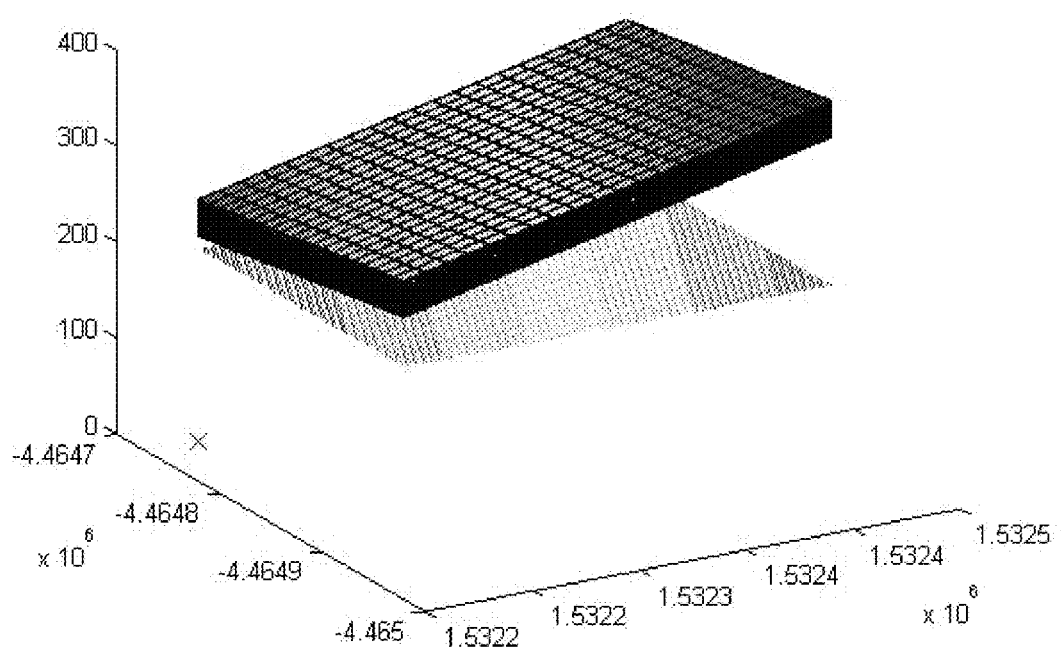
FIG. 4 is a graphical representation of multiple surfaces demonstrating the entire region and their respective SPS receiver clock bias for cases of bad satellite geometry, according to one embodiment of the present disclosure.

For the purpose of illustration, we divided the region into different z-planes and sketched the various values of SPS receiver clock bias versus x and y axes. For all the z-planes, and consequently the entire region, we can sketch all the surfaces on top of each other, which will look like FIG. 4. Again, it can be seen that for all z-planes, the shape of the SPS receiver clock bias variation is monotonic as it does not have any minimums on its local surface and values of SPS receiver clock bias variation are large. Therefore, it can be concluded that a local minimum for SPS receiver clock bias variation could not be obtained and hence, the current set of SPS measurements are not in agreement with the IEL.

It is worth mentioning that monotonicity of the clock variation cannot be observed by simply looking at the minimum value of SPS receiver clock bias. Hence, the abovementioned analysis allows the hybrid positioning system to determine if monotonicity of clock variation exists and hence rejects the current set of satellites.

Figure 5:
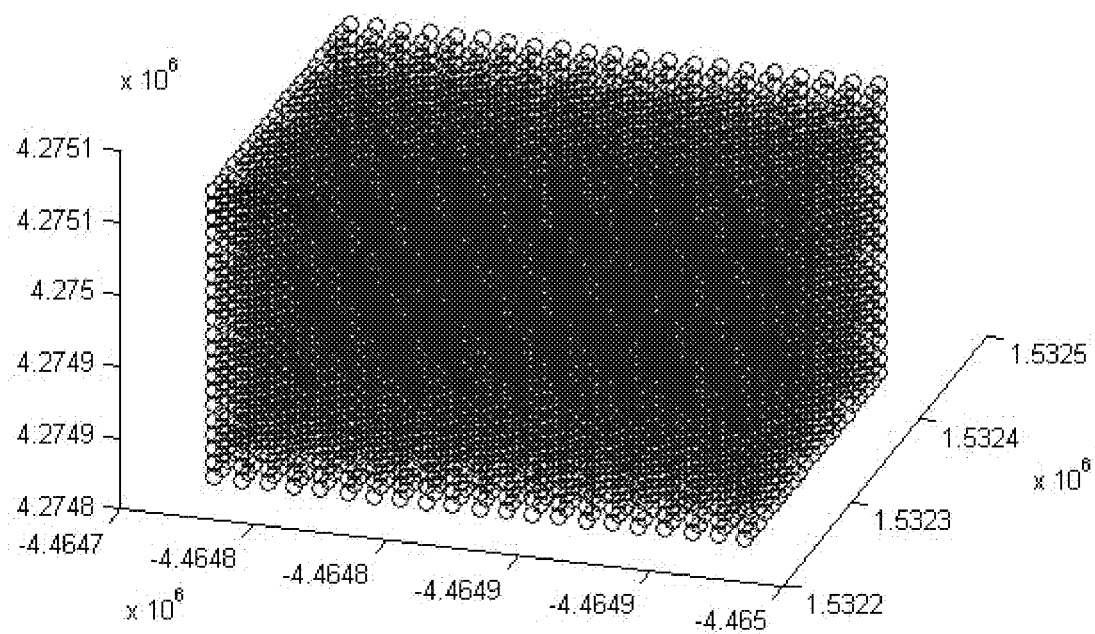
FIG. 5 is a color-coded graphical representation of a region to indicate the location of the location with minimum SPS receiver clock bias for cases with bad satellite geometry, according to one embodiment of the present disclosure.

In order to automate the process for mobile computing devices, we propose the following approach to detect the monotonicity by analyzing the variations of SPS receiver clock bias. Similar to the above methods, we form a region around the IEL and for each location we find the SPS receiver clock bias variance as described above. Then we find the minimum of all the locations' variations and choose the one with the absolute minimum value. If the minimum falls on the edges of the region, as indicated by FIG. 5, this will lead us to the fact that SPS receiver clock bias variation was a monotonic function and could not converge to a point inside the region. It should be noted that figures such as FIG. 5 are color coded to show the value of SPS receiver clock bias. Darker colors illustrate smaller variances for SPS receiver clock bias and consequently better estimates of the receiver location. In this case, the darkest location fell on the edge of the region and hence was rejected.

Through this method, low quality SPS measurements can be rejected. By detecting if the minimum point is on the edge, we can then declare that the received set of SPS measurements are of poor quality and their range measurements are erroneous; hence they cannot be used for hybrid positioning. For minimums that are located on the edge of the region, their value as a true minimum are untrustworthy. This is because only the interior of the region is searched. If the true minimum location was located two kilometers away from the region the location on the edge will be reported to be the minimum. For this reason we have to exclude all the locations that are on the edge.

Figure 6:
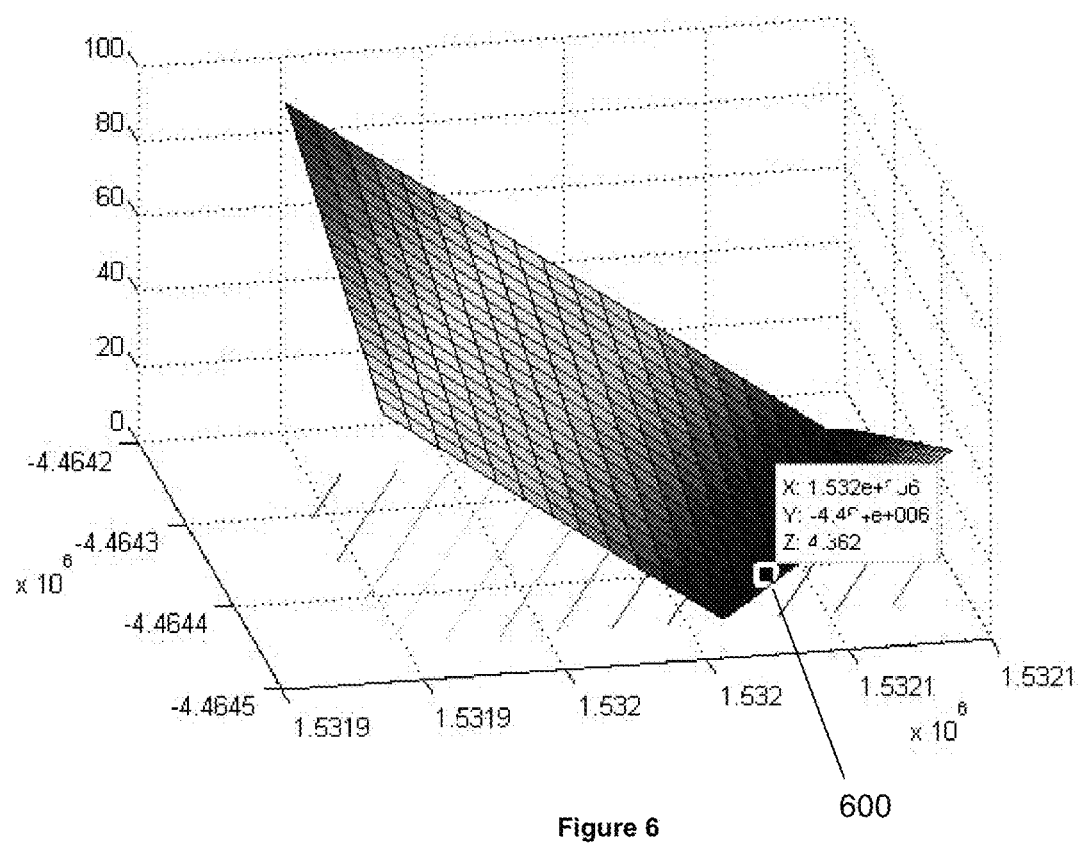
FIG. 6 is a graphical representation of a single surface demonstrating a single z-plane for cases of good satellite information, according to one embodiment of the present disclosure.
Figure 7:
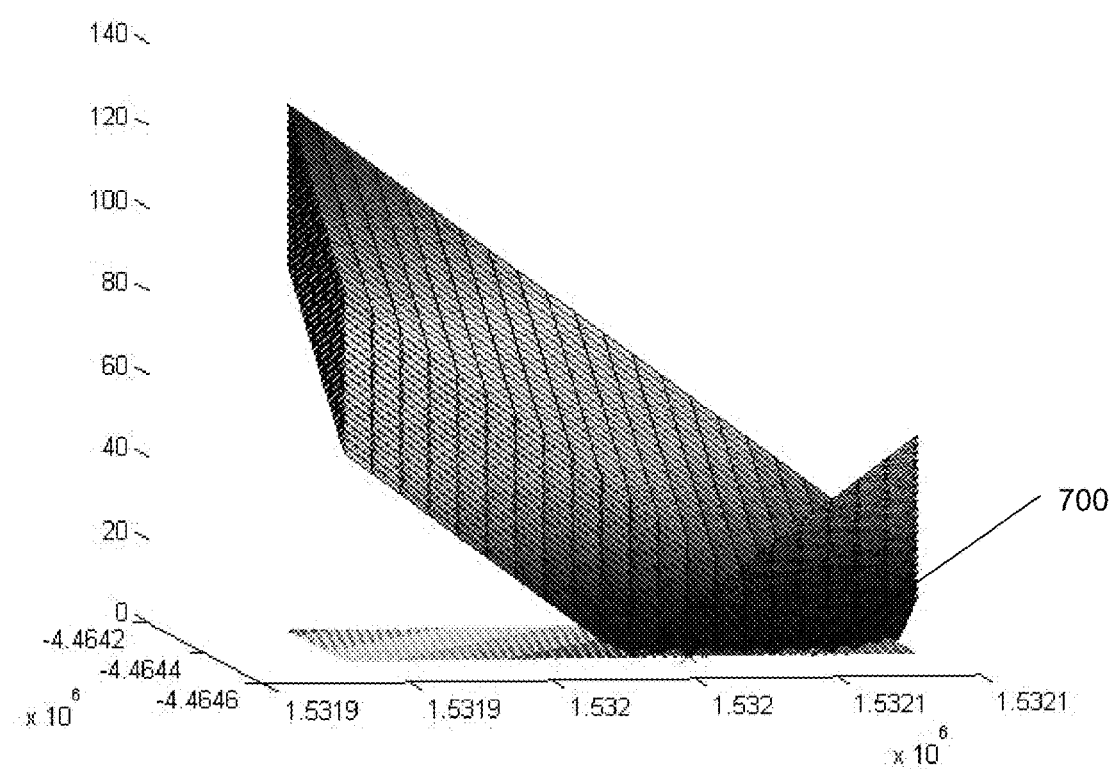
FIG. 7 is a graphical representation of multiple surfaces demonstrating the entire region and their respective SPS receiver clock bias for cases of good satellite geometry, according to one embodiment of the present disclosure.
Figure 8:
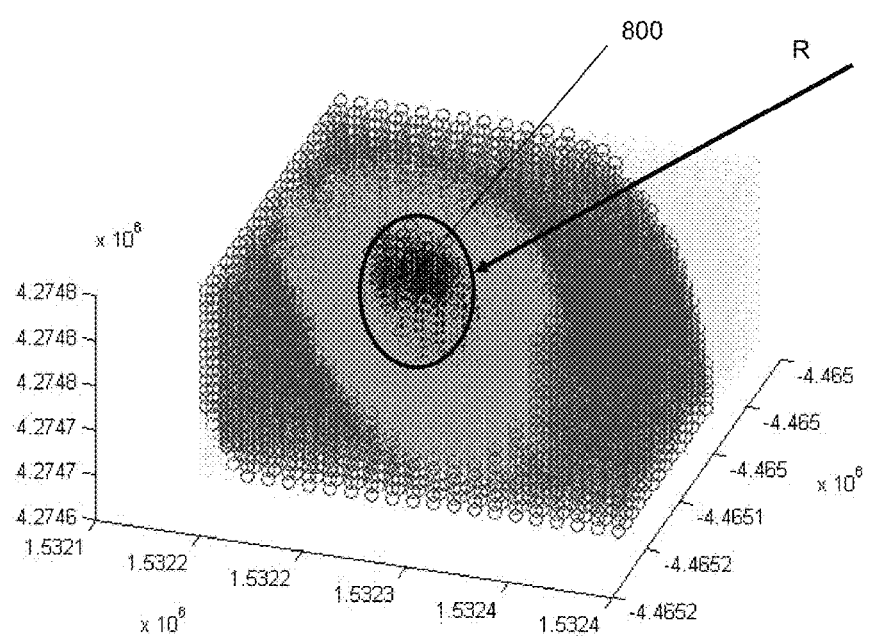
FIG. 8 is color-coded region to indicate the position of the location with minimum SPS receiver clock bias for cases with good satellite geometry, according to one embodiment of the present disclosure.

On the other hand, if the hybrid positioning system is able to find a location inside the region, the result will look similar to FIGS. 6-8. FIG. 6 illustrates variations of GPS receiver clock bias for an example of location with minimum variation. The Figure represents the values of SPS receiver clock bias for different values of x-axis and y-axis coordinates for a fixed z-value (different from figure's z-axis which shows the value of SPS receiver clock bias). The dark parts of the graph (which corresponds to the trough part of the graph) illustrate all the receiver location with close to minimum GPS receiver clock bias variation. It demonstrates that when the surface is not monotonic and has minimum values inside the box, those locations can be used for hybrid positioning. The same concept can be observed in FIG. 7 where several surfaces are illustrated together. The existence of the minimum 700 assures the system that system using SPS can find a better estimate of the location than just using the IEL alone. Hence it can provide a good estimate of the refined position of the end-user. In FIG. 8, it is possible to see that the darkest location 800 is inside the region. This darkest location is a minimum for the surface and the system from this minimum one can conclude that there exists at least one grid-location inside the region that can satisfy the variance requirement of the system.

Other embodiments of this disclosure describe a new technique in an integrated hybrid positioning environment, including an initial estimated location (IEL) along with its expected error, i.e. QoS, and SPS satellite information and range measurements, to remove a satellite from the current set of visible satellites to improve the accuracy of the location estimation. In order to do so, the invention relates the variations of SPS receiver clock bias estimate of the current set of satellites to the quality of estimated location.

As described above, in order to assess the quality of SPS measurements, the hybrid positioning system constructs a region centered on the IEL, calculates the variations of SPS receiver clock bias for all the locations inside the region, and selects the location with minimum variation.

The hybrid positioning system then compares this minimum variation of SPS receiver clock bias to its threshold. If sufficiently small, the current set of satellites can be used for positioning. The threshold value is a function of the QoS, i.e. expected error, of the SPS and IEL and level of desired accuracy. For more accurate applications, the system can set the threshold to smaller values. One example of the threshold values is 5 when the values are described in meters. Values between 0 and 5 are acceptable, while more than 20 should be rejected.

In the case of a large variance, we propose that the positioning system can check the subsets of the current visible satellites for the same defined region and remove the satellite which causes the large variation, i.e. the satellite with most inaccurate SPS receiver clock bias estimation. In order to do so, the positioning system forms different subset combinations. Similar to the general case, for each subset combination the positioning system finds the value of the minimum SPS receiver clock bias within the specified region.

The combination with smallest SPS receiver clock bias variation then can be chosen as our preferred set of satellites and the satellite which was excluded from that set can now be safely removed from the positioning algorithm. The resulting set of satellites then can be examined for further improvement using the same method. The process is repeated several times until the resulting set of satellites shows a consistent SPS receiver clock bias, i.e. very small variations, or only two satellites remain in the set. If the faulty satellite is removed, the resulting set of satellites will exhibit a smaller SPS receiver clock bias variation. The process is explained below.

For example, assume we have a set of N satellites, $(S_1, \ldots, S_N)$, we denote the estimated SPS receiver clock bias variation of this set as $$\bar{\tau}_{rms} = \frac{1}{N}\sqrt{\sum_{i=1}^{N}(\tau_i - \bar{\tau})^2}$$

where $$\bar{\tau} = \frac{1}{n}\sum_{i=1}^{N}\tau_i$$

is the unbiased sample mean of SPS receiver clock bias and $\tau_i$ is the estimate of SPS receiver clock bias of the i th satellite by the receiver.

We start with combination $(S_1, \ldots, S_{N-1})$ and find its SPS receiver clock bias, $$\bar{\tau}_{rms}_{i \in \{1,N\}-\{i=N\}}.$$

We repeat the process for different combinations of N−1 satellites out of N satellites and acquire a set of $$\bar{\tau}_{rms}_{i \in \{1,N\}-\{i=l\}}.$$

We can then select the set with minimum $$\bar{\tau}_{rms}_{i \in \{1,N\}-\{i=l\}}$$

as the best possible set of satellites.

We then conclude that the I th satellite, $S_I$, is satellite with the most inaccurate estimate of SPS receiver clock bias and can be removed from the set of visible satellites in order to improve the accuracy of the estimate of SPS receiver clock bias and ultimately to improve the accuracy of the estimation of the end-user location.

By removing the most inaccurate satellite from each set, we can improve the estimate of the SPS receiver clock bias. The process can be repeated until the SPS receiver clock bias variation is sufficiently small to ensure the needed consistency for location determination or there are only two satellites remaining Values of receiver clock bias variance between 0 and 5 can be acceptable.

Another embodiment of the disclosure describes a different method to assess the quality of the current set of satellites and to remove a satellite with the most inaccurate SPS receiver clock bias estimate from the current set. The embodiments use statistical parameters obtained from a set of receiver clock bias estimates to find and remove a satellite with an erroneous receiver clock bias estimate. In order to do so, the embodiments propose to analyze the set of receiver clock bias estimates and pick one which is an outlier to the current set and remove the corresponding satellite from the current set of satellites. This statistical analysis can be performed on any location within the defined region around IEL. This method reduces the computational cost of searching through all possible subsets of a set of SPS measurements.

Assume we have N satellites with estimates of SPS receiver clock bias estimates of $(\tau_1, \ldots, \tau_N)$. The estimate of the SPS receiver clock bias is then calculated with a sample mean as follows;

$$\hat{\tau} = \frac{1}{N}\sum_{i=1}^{N} \tau_i$$

In order to detect the satellite with the most inaccurate range estimate, we find the minimum, maximum, and median of the $(\tau_1, \ldots, \tau_N)$, denoted as $\tau_{max} = \max(\tau_1, \ldots, \tau_N)$ $\tau_{min} = \min(\tau_1, \ldots, \tau_N)$ $\tau_{med} = \text{med}(\tau_1, \ldots, \tau_N)$ We then compare the two values of $|\tau_{max} - \tau_{med}|$ to $|\tau_{min} - \tau_{med}|$. If $|\tau_{max} - \tau_{med}| > |\tau_{min} - \tau_{med}|$, we pick the satellite with maximum SPS receiver clock bias and remove that satellite from our set. Otherwise, we remove the satellite with minimum SPS receiver clock bias from our set of satellites.

It is also possible to identify the worst satellite (in terms of SPS receiver clock bias error) from a set without repeating the process for all the subsets. For this purpose, suppose we have N estimates of the SPS receiver clock bias, $$\tau_i \atop i \in \{1 \ldots N\}.$$

We first calculate the median of the set, $\tau_{med}$.

Then we find the maximum and minimum estimates, denoted by $\tau_{max}$ and $\tau_{min}$. We then find the two variables defined as:

$p_1 = |\tau_{max} - \tau_{med}|$ $p_2 = |\tau_{min} - \tau_{med}|$

If any of the pointers is more than certain threshold, i.e. $p_1 > \eta$ or $p_2 > \eta$, We take the maximum variable and remove the satellite corresponding to that estimate of SPS receiver clock bias. If $p_1 > p_2$ we select the satellite with maximum SPS receiver clock bias estimate and remove it from the current set of satellites. Otherwise, we select the satellite with minimum SPS receiver clock bias estimate and remove it from the current set of satellites.

If they are both below a threshold, i.e. $p_1 \leq \eta$ and $p_2 \leq \eta$, we proceed as following; if $p_1 \gg p_2$, i.e. $p_1$ is twice as large as $p_2$, we select the satellite with maximum SPS receiver clock bias estimate and remove it. Otherwise, if $p_2 \gg p_1$, we select the satellite with minimum SPS receiver clock bias estimate and remove it. If they are approximately on the same level, $p_1 \approx p_2$, the estimate of SPS receiver clock bias is good enough and there is no need to remove any satellite.

Other embodiments of this disclosure describe a new technique in an integrated hybrid positioning environment, including an initial estimated location (IEL) along with its expected error, i.e. QoS, and SPS satellite information and range measurements, to obtain a more accurate estimate of the receiver location. In order to do so, the method combines an aggregate or group of locations with small variations of SPS receiver clock bias to obtain a more accurate location. Specifically, all possible locations are examined and only those locations with a small receiver clock bias variation are selected. Then those selected locations are combined to determine a final location.

As described above, in order to refine the IEL with SPS measurements, the hybrid positioning system constructs a region centered on the IEL, calculates the variations of SPS receiver clock bias for all the locations inside the region, and selects the location with the minimum variation. Then, a second search is initiated through the locations inside the region and those locations whose SPS receiver clock biases are sufficiently small (i.e. locations with small clock variations) are selected. The current hybrid positioning uses the location with the absolute minimum of clock variation as its final reported location. The threshold to detect if a location has small SPS receiver clock bias is dependent on the QoS of SPS, QoS of IEL, statistics of the current set of receiver clock bias estimates, and desired level of accuracy.

In this disclosure we propose that the final estimate of the user location can then be computed from all these selected locations, because they are representing all the possible solutions for a receiver location. A simple combination method to obtain the final location is to average the locations with small SPS receiver clock bias variations. Other sophisticated methods such as weighted averaging are also possible.

In order to proceed to finding the final estimated hybrid location, note that each location inside the constructed region is associated with an SPS receiver clock bias. We can classify each location based on the value of its SPS receiver clock bias as depicted in FIG. 8. FIG. 8 represents the values for SPS receiver clock bias variation for a sample point for the specified region. The center of the region is provided by the IEL and the region is constructed by hybrid positioning system around the IEL. For each grid-location inside the region, the hybrid positioning system calculates the SPS receiver clock bias variation and represents its value with a color. The darker colors are used for small variations while lighter colors are for large variations. Since the system is interested in grid-locations with small variation, it has to select all the grid-locations which are marked by darker colors.

As shown in FIG. 8, we are interested in the set of locations with small SPS receiver clock bias variation, illustrated by darker colors in the figure. The set of such locations can be denoted by R to show that there is an area in the region which includes such locations. The final estimate of receiver location is then calculated as $$X_t = \frac{1}{N}\sum_{i=1}^{N} X_i$$

$$Y_t = \frac{1}{N}\sum_{i=1}^{N} Y_i$$

$$Z_t = \frac{1}{N}\sum_{i=1}^{N} Z_i$$

$$(X_i, Y_i, Z_i) \in R$$

For the best result in the implementation of the disclosed methods, when the three dimensional search through all locations is performed we start with an empty array and each new location which fits into this description, i.e. exhibits small variation in SPS receiver clock bias, can be appended to the array.

Other embodiments of this disclosure describe a new technique in an integrated hybrid positioning environment, including an initial estimated location (IEL) along with its expected error and SPS satellite information and range measurements, to speed up the process of location estimation. In order to do so, the method proposes to modify the three dimensional search and perform three two dimensional searches which consequently reduces the number of searches.

Exhaustive searching through all the locations for the location with minimum SPS receiver clock bias variation is a power consuming function which puts a considerable burden on the device's CPU and can slow down the process of positioning. For a region having a size of 200 meters with a step size of 10 meters, the processor has to search through 8000 locations and calculate the SPS receiver clock bias for each location and find the location with minimum SPS receiver clock bias variations which can take up to several seconds with current processors used in small mobile devices.

The present embodiment describes a method to reduce the size of a search for a given region size with specific number of locations. The 3D-search has to perform a search in all three local dimensions, namely X, Y, and Z.

In order to obtain SPS receiver clock bias, for each location we have to find the individual clock biases from the location to each satellite. If we name the location by $G_{ijk}$ notation (i.e. location i from X axis, j from Y axis, and k from Z axis), we can formulate the problem as following;

$$\bar{\tau}_{ijk} = \frac{\sum_{m=1}^{n} \tau_m^{ijk}}{n}$$

where $\bar{\tau}_{ijk}$ presents the unbiased estimate of SPS receiver clock bias at $G_{ijk}$, $\tau_m^{ijk}$ represents GPS receiver clock bias of $G_{ijk}$ from m th satellite, and n is the number of visible satellites.

Similar to the above methods, we define SPS receiver clock bias variation as;

$$\bar{\tau}_{ijk}^{rms} = \frac{\sqrt{\sum_{m=1}^{n} (\tau_m^{ijk} - \bar{\tau}_{ijk})^2}}{n}$$

which provides information about the deviation of the individual SPS receiver clock biases from the best estimate of SPS receiver clock bias, $\bar{\tau}_{ijk}$.

In traditional hybrid positioning system, the location with minimum $\bar{\tau}_{ijk}^{rms}$ is the solution to hybrid positioning problem. Mathematically, $$(\hat{x}, \hat{y}, \hat{z}) = \arg\min_{G_{ijk}}(\bar{\tau}_{ijk}^{rms}) = \left\{ G_{IJK} \mid \bar{\tau}_{IJK}^{rms} = \arg\min_{ijk}(\bar{\tau}_{ijk}^{rms}) \right\}$$

where $(\hat{x}, \hat{y}, \hat{z})$ represents the x, y, and z coordinates of the refined estimate.

We propose to find the aggregate of locations with sufficiently small $\bar{\tau}_{ijk}^{rms}$ and use this aggregate set to refine the initial position using following;

$$X_t = \frac{1}{N} \sum_{i=1}^{N} X_i$$

$$Y_t = \frac{1}{N} \sum_{i=1}^{N} Y_i$$

$$Z_t = \frac{1}{N} \sum_{i=1}^{N} Z_i$$

$$(X_i, Y_i, Z_i) \in R$$

this method is referred to as 3D search.

The 3D search requires to search over all possible i, j, and k.

Instead of performing a complete three dimensional search, this invention proposes to perform 2D-searches in all three dimensions. The 2D-searches are performed in XY dimension (XY plane), XZ dimension (XZ plane), and YZ dimension (YZ plane).

The number of searches in each 2D-search is smaller than the total number of searches in 3D-search, by order of the number of grid-locations in one direction. For a region size of 200 with step size of 10, we can perform a 20×20=400 search in each dimension. The total number of searches then reduces to 400×3=1200 instead of original 8000 searches. The resulting locations from each 2D-search which has the minimum SPS receiver clock bias can then be used to find the final estimate of the location of the receiver using the following;

$$X_t = \frac{X_1 + X_2 + X_3}{3}$$

$$Y_t = \frac{Y_1 + Y_2 + Y_3}{3}$$

$$Z_t = \frac{Z_1 + Z_2 + Z_3}{3}$$

where $(X_1, Y_1, Z_1)$ is the location with minimum SPS receiver clock bias in XY 2D-search, $(X_2, Y_2, Z_2)$ is the location with minimum SPS receiver clock bias in XZ 2D-search, and $(X_3, Y_3, Z_3)$ is the location with minimum SPS receiver clock bias in YZ 2D-search.

Mathematically;

$$(X_1, Y_1, Z_1) = \arg\min_{G_{ij,k=0}}(\bar{\tau}_{ij,k=0}^{rms}) = \left\{ G_{IJ,K=0} \mid \bar{\tau}_{IJ,K=0}^{rms} = \arg\min_{ij,k=0}(\bar{\tau}_{ij,k=0}^{rms}) \right\}$$

$$(X_2, Y_2, Z_2) = \arg\min_{G_{ik,j=0}}(\bar{\tau}_{ik,j=0}^{rms}) = \left\{ G_{IK,J=0} \mid \bar{\tau}_{IK,J=0}^{rms} = \arg\min_{ik,j=0}(\bar{\tau}_{ik,j=0}^{rms}) \right\}$$

$$(X_3, Y_3, Z_3) = \arg\min_{G_{jk,i=0}}(\bar{\tau}_{jk,i=0}^{rms}) = \left\{ G_{JK,I=0} \mid \bar{\tau}_{JK,I=0}^{rms} = \arg\min_{jk,i=0}(\bar{\tau}_{jk,i=0}^{rms}) \right\}$$

Figure 9:
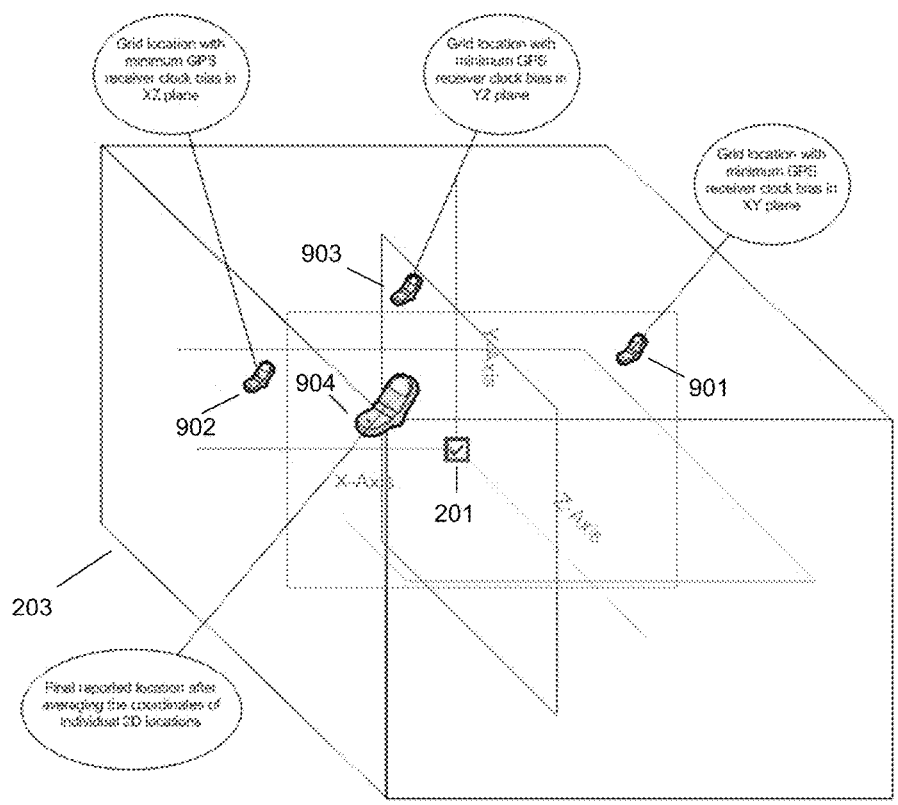
FIG. 9 depicts a two dimensional averaging method, according to one embodiment of the present disclosure.

FIG. 9 depicts this 2D search method. The IEL 201 is provided by WLAN-PS and hybrid positioning system constructs the region 203. The hybrid positioning system then calculates the variation for all grid-locations on the XY-plane and finds the grid location with minimum variation 901. The process is repeated for XZ-plane and YZ-plane to find the best estimates on those planes 902 and 903. The system then average the three estimates 901, 902, and 903 to obtain the final estimate 904. It can be observed that each 2D search consumes less time, by an order of number of locations in one dimension. The total number of searches is then three times the number of searches in a 2D search. Therefore, the receiver clock bias variation within the region can be calculated in less time and consuming less computational power by using the 2D method as opposed to the 3D method. The 2D search is less time consuming and more computationally efficient. However, the accuracy of 3D search is better than 2D search.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method for determining a location of a mobile device, comprising:
   determining an initial location estimate of the mobile device using a wireless local area network positioning system (WPS) that processes signals from access points in range of the mobile device and calculates the initial location estimate from characteristics of the signals;
   calculating a region around the initial location estimate;
   receiving, at a satellite positioning system (SPS) receiver of the mobile device, signals from a set of satellites of a SPS;
   based on the received signals, determining, by the mobile device, a receiver clock bias for at least two satellites of the set of satellites at each of a plurality of points within the region and calculating therefrom a variation in receiver clock bias at each of the plurality of points within the region;
   using the variation in receiver clock bias to refine an SPS estimated location of the mobile device; and
   reporting a final location estimate of the mobile device based on the SPS estimated location.

2. The method of claim 1, wherein the using the variation in receiver clock bias to refine the SPS estimated location further comprises:
   removing one or more satellites from the set based on the variation in receiver clock bias; and
   determining the SPS estimated location using the remaining satellites of the set.

3. The method of claim 2, wherein the removing one or more satellites further comprises:
   grouping the satellites into a plurality of sub-sets of satellites;
   determining a variation in receiver clock bias for each of the plurality of sub-sets;
   selecting a sub-set having a minimum variation in receiver clock bias; and
   removing a satellite that is not in the selected sub-set.

4. The method of claim 2, wherein the removing one or more satellites further comprises:
   determining a minimum value, a maximum value and a median value for receiver clock bias;
   comparing a difference between the minimum value and the median value and a difference between the maximum value and the median value; and
   removing a satellite having a maximum receiver clock bias or a minimum receiver clock bias based on the comparing.

5. The method of claim 1, wherein the using the variation in receiver clock bias to refine the SPS estimated location further comprises:
   selecting a point within the region having a minimum variation in receiver clock bias of the plurality of points; and
   using the point as the SPS estimated location.

6. The method of claim 5, wherein the selecting the point further comprises:
   performing two-dimensional (2-D) searches in multiple planes;
   and
   combining results from the 2-D searches.

7. The method of claim 6, wherein the planes comprise an XY plane, an XZ plane and a YZ plane.

8. The method of claim 1, wherein the using the variation in receiver clock bias to refine the SPS estimated location further comprises:
   selecting a plurality of points within the region having a variation in receiver clock bias that is less than a threshold;
   determining an aggregate location from the selected plurality of points; and
   using the aggregate location as the SPS estimated location.

9. The method of claim 8, wherein the aggregate location is an average of the selected plurality of points.

10. The method of claim 1, wherein the region is a three-dimensional (3-D) region centered upon the initial location estimate, wherein a size of the 3-D region is based on accuracy of the initial location estimate.

11. The method of claim 1, further comprising:
    producing the final location estimate as a combination of the initial location estimate determined using the WPS and the SPS estimated location.

12. The method of claim 11, further comprising:
    using the final location estimate as the SPS estimated location.

13. A method for determining a location of a mobile device, comprising:
    determining an initial location estimate of the mobile device;
    calculating a region around the initial location estimate;
    receiving, at a satellite positioning system (SPS) receiver of the mobile device, signals from a set of satellites of a SPS;
    based on the received signals, determining, by the mobile device, receiver clock bias for at least two satellites of the set of satellites at each of a plurality of points within the region and calculating therefrom a variation in receiver clock bias at each of the plurality of points within the region;
    removing one or more satellites from the set based on the variation in receiver clock bias; and
    determining a final location estimate of the mobile device using the remaining satellites of the set.

14. A non-transitory electronic device readable medium having instructions stored thereon, the instruction when executed by one or more processors being operable to:
    determine an initial location estimate using a wireless local area network positioning system (WPS) that processes signals from access points and calculates the initial location estimate from characteristics of the signals;
    calculate a region around the initial location estimate;
    based on signals received from a set of satellites of a satellite positioning system (SPS) at a SPS receiver, determine a receiver clock bias for at least two satellites of the set of satellites at each of a plurality of points within the region and calculate therefrom a variation in receiver clock bias at each of the plurality of points within the region;

use the variation in receiver clock bias to refine an SPS estimated location; and report a final location estimate based at least in part on the SPS estimated location.

15. The electronic device readable medium of claim 14, wherein the instructions when executed by the one or more processors are further operable to:

remove one or more satellites from the set based on the variation in receiver clock bias; and determine the SPS estimated location using the remaining satellites of the set.

16. The electronic device readable medium of claim 15, wherein the instructions when executed by the one or more processors are further operable to:

group the satellites into a plurality of sub-sets of satellites;

determine a variation in receiver clock bias for each of the plurality of sub-sets;

select a sub-set having a minimum variation in receiver clock bias of the plurality of sub-sets; and remove a satellite that is not in the selected sub-set.

17. The electronic device readable medium of claim 15, wherein the instructions when executed by the one or more processors are further operable to:

determine a minimum value, a maximum value and a median value for receiver clock bias;

compare a difference between the minimum value and the median value and a difference between the maximum value and the median value; and remove a satellite having a maximum receiver clock bias or a minimum receiver clock bias of the satellites of the set.

18. The electronic device readable medium of claim 14, wherein the instructions when executed by the one or more processors are further operable to:

select a point within the region having a minimum variation in receiver clock bias of the plurality of points;

using the point as the SPS estimated location.

19. The electronic device readable medium of claim 18, wherein the instructions when executed by the one or more processors are further operable to:

perform two-dimensional (2-D) searches in multiple planes;

and combine results from each 2-D searches to produce the SPS estimated location.

20. The electronic device readable medium of claim 14, wherein the instructions when executed by the one or more processors are further operable to:

select a plurality of points within the region having a variation in receiver clock bias that is less than a threshold;

determine an aggregate location from the selected plurality of points; and use the aggregate location as the SPS estimated location.

* * * * *

UNITED STATES PATENT AND TRADEMARK OFFICE
CERTIFICATE OF CORRECTION

PATENT NO. : 10,114,123 B2
APPLICATION NO. : 14/164799
DATED : October 30, 2018
INVENTOR(S) : Farshid Alizadeh-Shabdiz et al.

Page 1 of 1

It is certified that error appears in the above-identified patent and that said Letters Patent is hereby corrected as shown below:

In the Specification

Column 2, Line 18 reads:
"The Naystar Global Positioning System (GPS) operated"
Should read:
--The Navstar Global Positioning System (GPS) operated--

Signed and Sealed this
Twentieth Day of August, 2019

Andrei Iancu
*Director of the United States Patent and Trademark Office*